United States Patent [19]

Edwards

[11] 3,940,108

[45] Feb. 24, 1976

[54] REINFORCEMENT RING AND SEAT FOR BUTTERFLY VALVE
[75] Inventor: Robert B. Edwards, Milton Township, Cass County, Mich.
[73] Assignee: Nibco Inc., Elkhart, Ind.
[22] Filed: Sept. 11, 1974
[21] Appl. No.: 504,855

[52] U.S. Cl. ................ 251/306; 264/275; 164/112; 251/364
[51] Int. Cl.² .................... F16K 1/226; B22D 19/00
[58] Field of Search ........... 251/306, 307, 308, 305; 264/262, 275; 425/DIG. 47; 164/112; 249/83

[56] References Cited
UNITED STATES PATENTS

| | | | |
|---|---|---|---|
| 1,947,158 | 2/1934 | Henry | 249/83 |
| 2,002,122 | 5/1935 | McWane | 249/83 |
| 3,390,881 | 7/1968 | Senne | 264/275 |
| 3,537,683 | 11/1970 | Snell, Jr. | 251/306 |

Primary Examiner—William R. Cline
Assistant Examiner—H. Jay Spiegel
Attorney, Agent, or Firm—Price, Heneveld, Huizenga & Cooper

[57] ABSTRACT

An annular, rigid reinforcement ring embedded in a body of molded elastomeric material forms a valve seat for a butterfly valve. The seat has a pair of diametrically aligned shaft openings for the valve disc supporting and actuating shaft. These holes extend through the elastomeric material and the reinforcement ring and, during molding of the elastomeric material, are occupied by removable cores which center the reinforcement ring about the cores between the end faces of the mold and position it concentrically between the inner and outer circumferential walls of the mold cavity. To prevent the reinforcement ring from rotating about the cores and to center it positively between the end faces of the mold, a pair of support extensions are provided aligned axially of the ring. One support extension protrudes from each edge or end face of the reinforcement ring. The pair of support extensions maintains proper alignment of the reinforcement ring with the end faces of the mold. These support extensions are located circumferentially along the reinforcement ring approximately halfway between the cores. A second pair of support extensions may be used, positioned from the first pair approximately diametrically on the reinforcement ring.

1 Claim, 5 Drawing Figures

REINFORCEMENT RING AND SEAT FOR BUTTERFLY VALVE

BACKGROUND OF THE INVENTION

Butterfly valves normally consist of a housing or body within which an annular elastomeric seat is mounted for the purpose of effecting a resilient seal against the pivoted valve closure member. The valve closure member is a disc which may be rotated from an open position, aligned with the direction of flow of a fluid through the valve to a closed position at right angles to the direction of flow. In this latter position, the peripheral edge of the disc tightly engages the valve seat to effect a seal. In the conventional butterfly valve, this seat is molded of an elastomeric material whereby, as the valve's disc is rotated into closed position, the seat has a limited degree of resilience which will permit a seal effecting, interference fit between the disc and the seat, providing a fluid tight closure.

The need for a certain degree of resilience and, thus, displaceability of the valve seat necessitates the use of an elastomeric material. Materials of this type have a tendency to creep or migrate when subjected to high pressure, particularly when the pressure is applied to the seat on one side of the disc without a corresponding supporting pressure on the other side of the disc. The need to control this migration or creep without sacrifice of the necessary resilience of the elastomeric material has caused the industry to adopt the use of reinforcing members in the seat. These reinforcing members are rigid and provide support for the elastomeric material, limiting its ability to creep or migrate.

One of the more commonly used types of reinforcement is an annular ring or band of rigid material embedded within the seat as the seat is molded. It is important that this reinforcement be accurately positioned within the seat if the seat is to have uniformity of strength, and accurate control of deflection, migration and creep is to be maintained. During the actual molding process, the elastomeric material is injected into the mold, at high pressures. This tends not only to deflect but also to displace the reinforcement member and, thus, mislocate it within the seat. This results in a defective seat. This invention overcomes this problem.

One proposal for solving this problem is disclosed in U.S. Pat. No. 3,537,683 issued Nov. 3, 1970 to A. H. Snell, Jr., entitled VALVE SEAT FOR A BUTTERFLY VALVE AND METHOD FOR MAKING THE SAME. This solution, however, is not entirely satisfactory. This solution requires modification of a conventional mold by the addition of lateral pins. Further, it results in openings in the valve seat which extend from the outer periphery of the valve seat through the reinforcement member, thus, creating a weakness which, as the patent points out, will result in leakage under certain circumstances. If this result is to be avoided, the opening has to be subsequently plugged to prevent the leakage. Even plugging does not overcome the fact that an opening is created through the reinforcement member, thus, permitting differential deflection of the seat at the hole because the plug cannot provide the same uniformity of support as would a continuous, uninterrupted reinforcement member.

This invention has the advantage of so molding the seat that there are no holes that result from aligning the reinforcement member. There are support projections which protrude axially from the reinforcement member. The support projections position the reinforcement member during molding. Any exposed end faces of the support projections are located in the end faces of the sealing member and can be positioned in the axially facing recesses between the end sealing beads. As so located, they do not interfere with the seal formed between the end faces of the valve and the end flanges of the pipes between which the valve is mounted.

SUMMARY OF THE INVENTION

The valve seat of this invention is of the annular type having a reinforcement band or ring. It is molded in a mold having an annular cavity into which project a pair of removable cores for forming the holes which are later used for the disc supporting and actuating stems. These cores pass through corresponding holes in the reinforcement ring. With the mold open, the reinforcement ring is placed in the mold and the cores are moved to extended position. In so doing, the cores move through the stem or shaft openings in the ring and appropriately located shoulders on these cores center the ring with respect to the inner and outer walls of the mold.

In accordance with this invention, the reinforcement ring has support extensions which prevent the ring from pivoting about the cores. Without these support extensions, a point 90° from the cores can be rotationally displaced toward one or the other of the end faces of the mold. The support extensions are at least one pair of axial protrusions from the axial end faces of the ring. The pair is located at approximately 90° from the shaft openings. The protrusions are aligned and extend, one from each of opposite end faces of the ring, and are of such length that when the mold is closed, the protrusions seat or almost seat within the normal limits of manufacturing tolerances against the end faces of the mold and accurately position and lock the reinforcement ring in parallel alignment with the end faces of the mold. When the elastomeric material is injected into the mold, the combination of the cores and the support extensions stabilizes the reinforcement ring, holding it accurately positioned within the mold.

DESCRIPTION OF THE PREFERRED EMBODIMENTS

Figure 1:
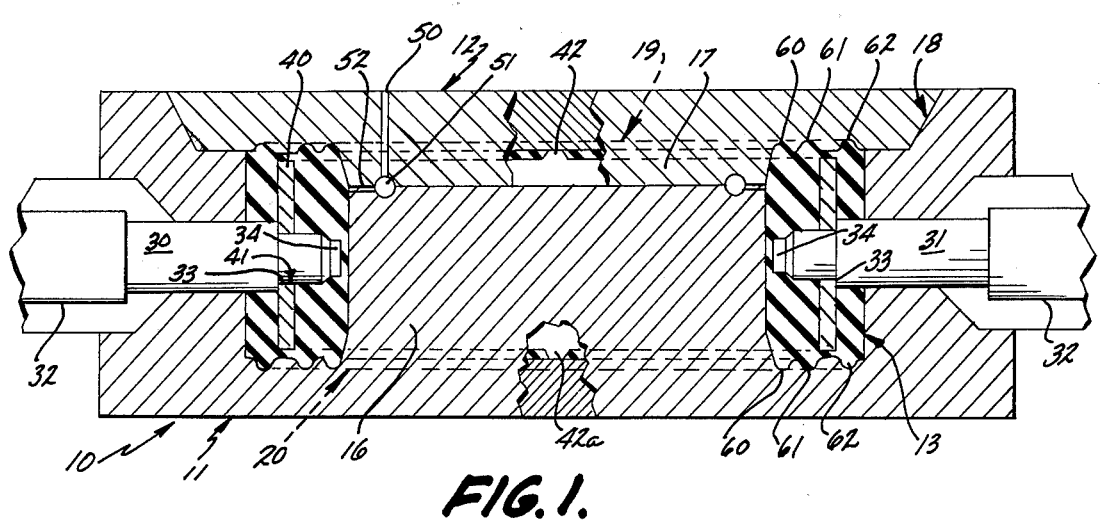
FIG. 1 is a central sectional view of the mold and valve seat partially broken away to disclose the support projections used in the practice of this invention.

Referring first to FIG. 1, the numeral 10 refers to a mold having a cavity or female portion 11 and a closure or cover member 12. The mold portion 11 has an annular cavity 13 defined by generally concentric inner and outer cavity walls 14 and 15 shown in FIG. 2. The center of mold portion 11 is formed by an upstanding boss 16 which matches with a depending boss 17 which is part of the closure member 12. The cavity or female portion 11 of the mold is separated from closure member 12 along a parting line 18. The mold has end faces 19 and 20.

The mold is equipped with a pair of diametrically positioned, reciprocal cores 30 and 31. The cores are actuated to extend and retract by suitable means such as a hydraulic piston and cylinder assembly 32. Since these are conventional, they are illustrated only schematically. It will also be understood that they would normally be provided with a common control for simultaneous operation. This again, is conventional practice and, therefore, is not illustrated. When cylinder assemblies 32 are actuated to retract cores 30 and 31, the cores withdraw entirely from mold cavity 13.

Each of the cores 30 and 31 has a shoulder 33. Projecting beyond shoulders 33 each of the cores has a stem 34 of such length that when the cores are fully extended, the ends of stems 34 either touch or almost touch boss 16. For the purpose of this invention, it is irrelevant whether cores 34 do or do not contact boss 16 and, in fact, provisions could be made for them to enter a suitable hole in the boss and, thus, pass entirely through cavity 13. As shown, stems 34 have a step such that the inner ends are of reduced diameter. This again, is not essential to this invention, it being entirely possible to practice the invention with a stem portion of uniform diameter throughout its length. It is, however, important that the diameter of that portion of the stem which passes through the hereinafter described reinforcement ring be such that the opening in the ring fits reasonably closely about the stems.

Figure 3:
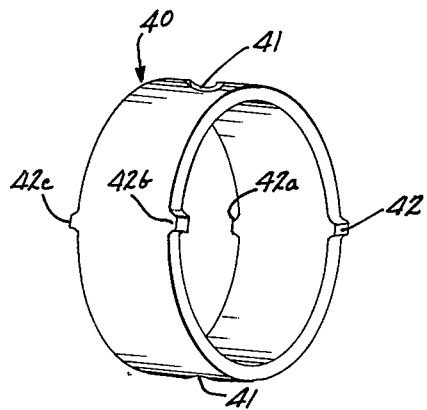
FIG. 3 is a perspective view of a reinforcement ring constructed in accordance with this invention.

FIG. 3 shows a reinforcement ring 40 in accordance with this invention. Reinforcement ring 40 has stem openings 41. Stem openings 41 are centered midway between the end faces of the ring and are diametrically positioned. Further, reinforcement ring 40 has axially aligned and projecting support extensions or legs 42 and 42a. The support extensions are circumferentially located approximately 90° from the stem openings 41. In a modified version as shown in FIG. 3, an additional pair of support extensions 42b and 42c are provided located diametrically of the ring with respect to the support extensions 42 and 42a.

To initiate the molding of a seat in accordance with this invention, the mold is first opened and then, with the cores 30 and 31 retracted, reinforcement ring 40 is placed in the mold. Cores 30 and 31 are then extended to operative position. As the cores extend, stem portions 34 pass through stem openings 41 in the ring. It will be seen that shoulders 33 on cores 30 and 31 acurately position the ring 40 concentrically within the mold cavity with respect to inner and outer cavity walls 14 and 15. Also, since stem openings 41 are midway between the edges of the reinforcement ring (FIGS. 1 and 5), the ring, at the cores, is accurately and equally spaced from end faces 19 and 20 of the mold.

Support extensions 42 and 42a extend to the end faces of the mold to prevent the ring from rotating about the stems. Without these supports the ring is free to rotate about the stems and, thus, at a point 90° removed from the stems could be tipped toward one or the other of end faces 19 or 20 of the mold. The support extensions protrude only that distance from the end faces of the ring necessary for the support extensions to engage the end faces of the mold. Thus, when the mold is closed, the support extensions stabilize and align the reinforcement ring as illustrated in FIG. 1. When reinforcement ring 40 is of substantial width, as illustrated in FIG. 1, the axial length of the support extensions is quite short. If the width of ring 40 is reduced, the length of the support extensions has to be correspondingly increased.

The support extensions are not subjected to extremely high loadings and, therefore, their ends can be of small cross section. It is advantageous to keep the ends of the support extensions as small as possible so that any exposed end faces of the support extensions in the seat are so small as to be insignificant.

It will be recognized that the support extensions, when the mold is closed, will accurately stabilize reinforcement ring 40 so that its edges are parallel to end faces 19 and 20 of the mold. A single pair of support extensions is sufficient to accomplish this purpose. However, in many cases, it may be desirable to add a second and identical pair of support extensions diametrically opposite from the first pair to provide further stabilization. This is suggested by support extensions 42b and 42c. By providing a second pair of support extensions, positive support of reinforcement ring 40 is provided which will prevent the ring from being distorted due to the pressures inherent in the injection of the elastomeric material into the mold. It will be recognized that when the distance between the end faces of a pair of support extensions is of minimal length within tolerance limits a gap will occur between the end faces of the mold and the end faces of the support extensions. However, for all normal usage such a gap will be entirely functional for the purpose of this invention. Such a gap may be filled with very thin film of elastomeric material.

Figure 2:
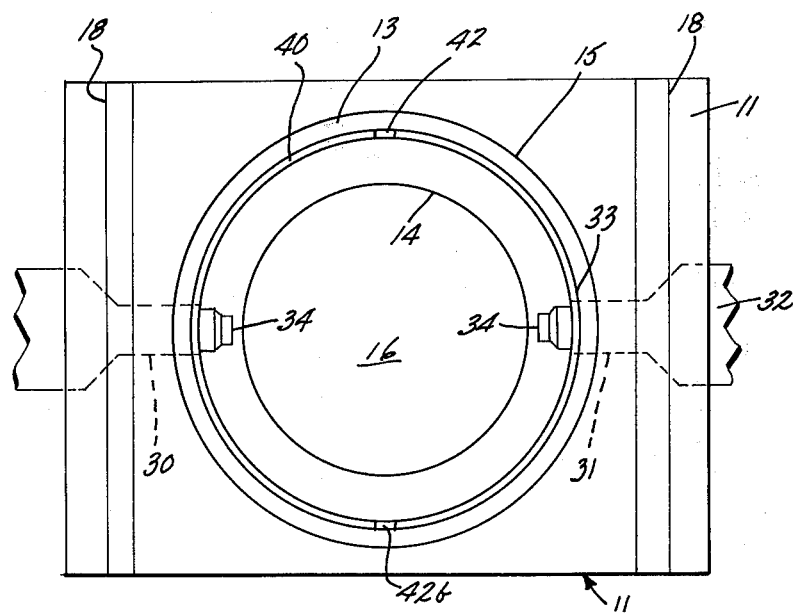
FIG. 2 is a schematic view of the mold illustrating the mold in open condition with the reinforcement ring seated in the mold as it would be just before the mold is closed.

With reinforcement ring 40 positioned as indicated in FIG. 2 in the mold, cover or closure member 12 is installed, thus, clamping the ring between the end faces of the mold. The elastomeric material is then injected into the mold through one or more of the gates 50 (FIG. 1). The elastomeric material under pressure is then caused to migrate along a distribution channel 51 and enter the mold through a gap 52. This gap is as thin as possible and may be no more than 0.015 of an inch. The narrower gap 52, the thinner the web of flash left on the final product when the seat is removed from the mold. After the mold has been filled with the elastomeric material and this material has set, cores 30 and 31 are retracted, closure member 12 is removed and a butterfly valve seat in accordance with this invention is taken out of the mold.

Figure 4:
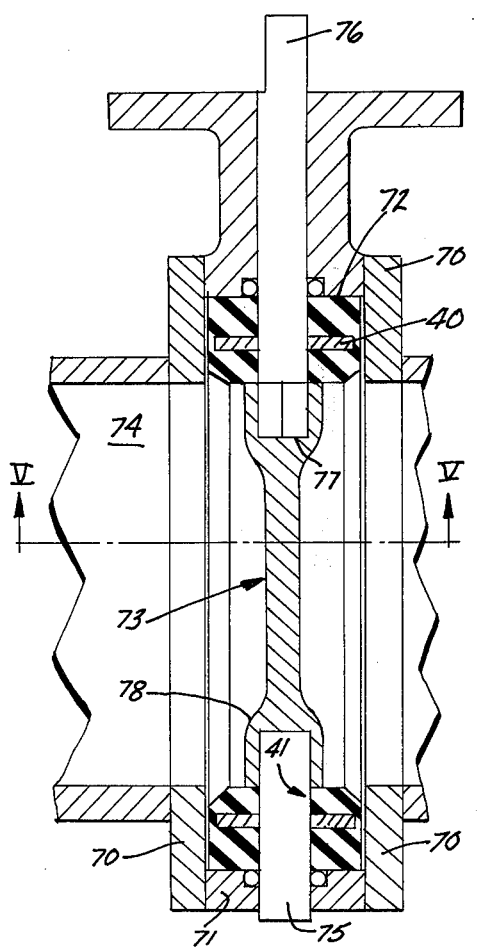
FIG. 4 is a central sectional view of a butterfly valve equipped with a seat incorporating this invention illustrating the valve in closed condition.

The butterfly valve seat is shown in FIG. 4 and numbered 55. It will be noted that in this particular embodiment of the invention the radial wall thickness of the reinforcement ring is only a minor portion of the radial wall thickness of the valve seat. Further, it will be noted that the end faces of the seat are provided with axially extending, concentric beads 60, 61 and 62. The provision of beads of this type on the axial faces of a butterfly valve seal is conventional. However, by so arranging them that the area of the axial face which overlies the edge of reinforcement ring 40 is positioned between a pair of the beads is a facet of this invention. By so spacing beads 61 and 62 that support extensions 42, 42a, 42b and 42c are located in the axially recessed areas between them, it is possible to isolate any exposed metal end faces of the support extensions from both the outer and inner portions of the seal. As is well-known in the butterfly valve art, these beads are pressed tightly against flanges 70, shown in FIG. 5, of the pipe ends between which the butterfly valve is installed. By tightening the conventional bolts provided for pulling the flanges together and clamping the butterfly valve in place, these beads are deformed and so tightly pressed against these flanges as to form a tight, leakproof seal against the migration of fluids, either liquids or gases, between the seal and the flanges. By locating the support extensions in the recesses between the beads, the beads isolate the ends of the support extensions from the liquids or gases which flow through the valve. Also because the support extensions never extend beyond the bottoms of the recesses between the beads, they cannot interfere with the clamping action of the flanges 70 against the beads necessary to effect a seal. The same is true whether a single pair or a double pair of the support extensions are utilized.

The assembled valve is illustrated in FIG. 4. Seat 55 is seated within a housing or valve body 71. In the case of the seat illustrated in this embodiment, the seat is installed by press fitting it endwise into the valve body bore 72. A valve disc 73 is then placed in the central fluid passage 74 of the seat and secured by installation of a stub shaft 75 and a main shaft 76. The ends of these shafts seat in bosses 77 and 78 of the disc 73. A nonrotatable engagement is provided by the boss 77 between the valve disc and the main shaft 76. All of this is conventional in butterfly valve construction.

Figure 5:
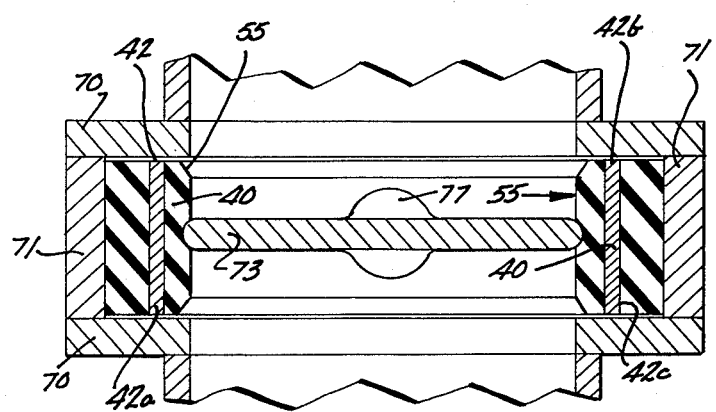
FIG. 5 is a sectional view taken along the plane V—V of FIG. 5.

FIGS. 4 and 5 illustrate the valve in closed position. FIG. 5 shows that the seal forming engagement between the valve disc 73 and seat 55 is substantially spaced from support extensions, 42, 42a, 42b and 42c. Thus, no matter how much deflection pressure is exerted on the seat by the valve disc or fluid pressure differential across the point of seal, there is no possibility of the axial end faces of the support projections impairing the seal. The reinforcement ring being uniformly positioned with the seat provides a dependable seal in the area of seat-valve engagement.

It will be recognized that this invention may be used irrespective of the type of elastomeric material used in the molding of the seat. The invention, thus, has the advantage of being versatile in its application. Further, the invention does not require any reconstruction of existing molds. Thus, the molding operation has an advantageous simplicity which tends to reduce costs. The invention has the advantage of automatically accurately positioning the ring in a predetermined, stable position in the mold without requiring the operator to exercise any particular precautions when the ring is placed in the mold. This substantially reduces manufacturing costs. It eliminates the problem of costly rejects.

These and other advantages of this invention will be readily understood by those skilled in the art of butterfly valves. They will recognize that the invention is useful whether the seat is fabricated as a separate component or is molded within the housing and, thus, permanently bonded to it. It will be recognized that the invention may be used with reinforcement rings of various widths and that the same advantages of uniform and complete support for the seat along the line of disc contact when the valve is closed will be obtained with this invention, irrespective of whether the disc is centered about the shafts 75 and 76 or is eccentric of them as some valves are constructed. Thus, from the preceding discussion, it will be recognized that the design of the reinforcement member and the overall design of the seat and of the valve may be varied widely without departing from the principles of this invention.

The embodiments of the invention in which an exclusive property or privilege is claimed are defined as follows:

1. A seat for a butterfly valve, said seat being annular and having a central axially extending passageway therethrough; said seat having a body of molded elastomeric material, an annular rigid reinforcing ring embedded in said material; a pair of diametrically positioned shaft openings through said seat and said reinforcing ring having their central axis arranged radially of said seat; said seat having a pair of axial end faces; each of said end faces having a pair of radially spaced axially extending annular beads projecting outwardly from the surface thereof forming an annular recess therebetween, the improvement in said seat comprising: a pair of axially aligned support extensions projecting axially from opposite axial faces of said ring; said ring being radially aligned with said recesses and the maximum axial width of said extensions being no greater than the axial thickness of said body of molded elastomeric material at the bottoms of said recesses whereby said beads may be compressed to form a seal when said valve is installed without interference from said extensions.

* * * * *